United States Patent
Kaiser et al.

(10) Patent No.: US 11,805,939 B2
(45) Date of Patent: Nov. 7, 2023

(54) COOKING DEVICE, SYSTEM AND METHOD FOR CONTROLLING THE COOKING DEVICE

(71) Applicant: Miele & Cie. KG, Gütersloh (DE)

(72) Inventors: Ingo Kaiser, Paderborn (DE); André Mersch-Justus, Schloß Holte-Stukenbrock (DE); Dominic Beier, Gütersloh (DE); André Kersting, Wadersloh (DE); Martin Lind, Rietberg (DE)

(73) Assignee: MIELE & CIE. KG, Gütersloh (DE)

( * ) Notice: Subject to any disclaimer, the term of this patent is extended or adjusted under 35 U.S.C. 154(b) by 367 days.

(21) Appl. No.: 16/812,643

(22) Filed: Mar. 9, 2020

(65) Prior Publication Data

US 2020/0288909 A1  Sep. 17, 2020

(30) Foreign Application Priority Data

Mar. 13, 2019  (DE) ...................... 10 2019 106 329.9

(51) Int. Cl.
*G06N 20/00* (2019.01)
*A47J 36/32* (2006.01)
(Continued)

(52) U.S. Cl.
CPC ............. *A47J 36/321* (2018.08); *A47J 27/62* (2013.01); *G06N 20/00* (2019.01); *G06V 20/64* (2022.01); *G06V 20/68* (2022.01)

(58) Field of Classification Search
CPC .................................. A47J 36/321; G06K 9/00
(Continued)

(56) References Cited

U.S. PATENT DOCUMENTS

2013/0290208 A1* 10/2013 Bonmassar ........ G06Q 10/1053
705/321
2016/0059412 A1*  3/2016 Oleynik .................. B25J 19/02
700/250
(Continued)

FOREIGN PATENT DOCUMENTS

DE  102012204229 A1  9/2013
DE  102014103457 A1  10/2015
(Continued)

*Primary Examiner* — Ruay Ho
(74) *Attorney, Agent, or Firm* — Dickinson Wright PLLC (57) ABSTRACT

A method for controlling a cooking device includes the following steps: recording an image of food; implementing a recognition of the recorded image of the food to determine the likelihood that the food corresponds to known foods. If a probability value exceeds a default threshold value, a cooking program associated with the known food is selected and specified to the cooking device. The probability value for the recorded image and the associated food is increased in response to a user subsequently starting the selected cooking program, and reduced in response to the user discarding the selected cooking program. A cooking device includes a primary control unit for controlling the cooking functions; a network interface with a second control unit, and a camera for recording images of the cooking space. The second control unit processes recorded images independently of the primary control unit and transmits them over the network interface.

10 Claims, 4 Drawing Sheets (51) Int. Cl.
   *A47J 27/62*   (2006.01)
   *G06V 20/64*   (2022.01)
   *G06V 20/68*   (2022.01)

(58) Field of Classification Search
   USPC .......................... 219/490; 700/250; 705/321
   See application file for complete search history.

(56) References Cited

U.S. PATENT DOCUMENTS

| | | | |
|---|---|---|---|
| 2017/0185236 A1* | 6/2017 | Yang | H04L 51/04 |
| 2018/0075034 A1* | 3/2018 | Wang | G06F 16/24578 |
| 2018/0292092 A1* | 10/2018 | Bhogal | F24C 7/087 |
| 2018/0314866 A1* | 11/2018 | Kotula | G06T 7/0004 |
| 2019/0295440 A1* | 9/2019 | Hadad | G16H 20/60 |
| 2020/0073877 A1* | 3/2020 | Winter | G06V 20/49 |
| 2022/0358922 A1* | 11/2022 | Srivastava | G06F 9/38 |

FOREIGN PATENT DOCUMENTS

| | | | | |
|---|---|---|---|---|
| DE | 3570207 A1 | * | 11/2019 | G06K 9/00 |
| EP | 2977683 A1 | | 1/2016 | |

* cited by examiner

COOKING DEVICE, SYSTEM AND METHOD FOR CONTROLLING THE COOKING DEVICE

TECHNICAL FIELD

The invention relates to a method to control a cooking device, a cooking device, and a system with the cooking device.

BACKGROUND

Premium-quality cooking devices frequently feature a number of automatic cooking programs for various dishes. However, the process from the selection until the starting of an automatic program is relatively complex, that is, the user must run through or perform a high single-digit or even two-digit number of steps in order to adjust the cooking device accordingly. For example, on average a number of 8 setting steps are required in a menu structure until the program starts.

In addition, these programs are limited to a specific number, for example because of limited memory in the device controller, and perhaps cannot be adapted accordingly. Due to the necessity for standardization of these programs, they are not always optimally adapted for individual foods or food dishes.

For the preparation of dishes that are not available as an automatic program, the user must operate manual inputs to attain a setting suitable for a specific product. In this regard a plurality of information is input by the user about the cooking process and the food to be cooked. The properties of the food and of the dish have a considerable effect on the end result of the food preparation. For this reason the user often has to refer to cooking guides and other selected research sources to obtain comprehensive information. This input and information process is very time-consuming and due to the flood of information available on the internet and sometimes due to inconsistencies in cooking guides, it often leads to erroneous results. Consequently, a wrong input can lead to a wrong, or to a less than optimum, preparation of the food.

In addition, the cooking devices cannot discern that a user has already prepared a particular food and is merely preparing it again. Consequently this means that the user must input anew all the same inputs before preparation of the same dish that is not already available as an automated program. The cooking data for standardized, finished dishes, such a frozen products, are usually guideline values which are not optimally adjusted to the employed cooking device.

SUMMARY

It is therefore the object of the invention to create a control method for a cooking device, and also a cooking device in which the interaction effort of the user can be limited. Thus the named disadvantages can be eliminated or at least reduced. Thus the user will experience a significant reduction in time expended and in possible sources of error.

According to one feature of the invention, a method for controlling of a cooking device is provided, comprising the following steps:
recording an image of food to be cooked;
implementing a recognition of the recorded image of the food to be cooked, based on machine learning, to determine probability values of a likelihood that the food to be cooked corresponds to known foods to be cooked;
upon one of the probability values exceeding a default threshold value, selecting a cooking program associated with the corresponding one of the known foods to be cooked;
specifying the selected cooking program to the cooking device; and at least one of the two following steps:
increasing the probability value for the recorded image and the one of the known foods associated with the recorded image in response to a user subsequently starting the selected cooking program; and
reducing the probability value for the recorded image and the one of the known foods associated with the recorded image in response to the user discarding the selected cooking program.

Foods are recognized by using the method before the start of a cooking program via object recognition based on an image recorded by the camera. Visual object recognition is based on machine learning. In the identification of the food and/or of the dish to be cooked, a search is made for coincidence of the recorded image with previously defined samples and/or with image characteristics. Depending on the determined food to be cooked, the optimum cooking process is ascertained, in that an appropriate cooking program is selected. All information necessary for adjusting of parameters of the cooking process are consequently determined and selected automatically by the cooking device.

Recognition and selection of a cooking program takes place according to the invention only when at least one default threshold value, for example 80%, of coincidence is reached or exceeded. In the case that the coincidence value is less, then a reliable recognition cannot be assumed.

Based on the input cooking program, the cooking device can suggest an automatic cooking program to the user. "Input of a cooking program" within the sense of this invention also means to transfer the cooking program as such, but likewise to transfer information to the cooking device that will enable it to determine the cooking program by itself, such as by calling up or determining a cooking program from an internal memory.

According to the invention, no explicit confirmation is required from the user, e.g. by selection of the correct food to be cooked from a suggested list. Instead, an indirect confirmation is judged to be that the suggested cooking program corresponds to the food to be cooked and that the user subsequently starts the suggested program. This reduces the number of required operating steps and is also intuitive for the user.

In the context of this application, the phrase "subsequently starts" is understood to mean that the user in the meantime does not select any other program or does not switch the device off and then on again. This does not exclude that the user of the device will provide different inputs, such as for example, a programmed time for subsequently starting the program. Also, "starting" does not mean exclusively an immediate starting, but also means to activate a timer program such that accordingly, without additional user intervention, the program will start at an input time or after an input time span.

Due to the invention, the quality of the machine learning algorithm can be continually improved. If the user discards the proposed automatic program, then it can be assumed that the recognition did not lead to the correct result, and conversely it can be assumed that the recognition was correct if the user starts the program. The probabilities of the machine learning process can be adapted accordingly, in order to provide an improved result for future recognition. In other words: according to the invention the use of the image and of the (indirect) confirmation and/or of the contradiction reported back by the user leads to an improvement in the recognition value within the scope of improving a machine learning model or algorithm.

According to one preferred implementation, the method further provides that if the at least one probability does not exceed the default threshold value or the user discards the selected cooking program,
- a food to be cooked and/or a cooking program subsequently selected by the user of the cooking device is detected; and
- an association between the recorded image and the food to be cooked and/or the cooking program is formed, or the probability of an existing association is increased.

According to one preferred embodiment, the image is recorded by a camera of the cooking device or by a mobile terminal.

The method according to the invention can make use of a camera provided in the cooking device, but likewise alternatively or additionally can make use of a camera of a mobile terminal, such as a smartphone or tablet.

According to one preferred embodiment, the method additionally provides that, if the probabilities of a plurality of known foods to be cooked exceed the default probability value:
- selecting of a particular cooking program for each known food to be cooked, whose probability exceeds the default threshold value;
- inputting the selected cooking programs in the sequence of descending probability to the cooking device;
- wherein the probability value for the recorded image and the associated food to be cooked is increased for the cooking program that is subsequently started by the user.

According to one preferred embodiment, the probability value for the recorded image and the associated food to be cooked is reduced for cooking programs which the user does not subsequently start. The confirmation or rejection of the recognition does not necessarily lead directly to an increase or decrease in the probability of recognition. Perhaps the algorithm will have to be retrained and calibrated with the aid of the new information, before this will have an effect on the real recognition process.

According to one preferred embodiment, the selected cooking program is input to the cooking device in that a food to be cooked is specified for the associated cooking program. According to another feature, a cooking device is provided which is configured to implement the proposed method and comprises a primary device control unit for controlling of operating and display elements and of cooking functions of the cooking device; a network interface with a second control unit; and a camera which is connected to the second control unit and which is configured to record images of the cooking space; wherein the second control unit is configured to process recorded images independently of the primary device control unit and to transmit them over the network interface.

Cameras are becoming increasingly common in household devices. The system topologies common today for the use of cameras in household devices offer little flexibility and permit little performance of the camera system. Usually the camera modules with integrated image signal processing (ISP) are tied to a microcontroller or microprocessor (controller) by means of a performant camera interface (e.g. MIPI). In addition, topologies are also found where the camera chip is tied directly via an interface to the control computer that additionally handles the necessary computer-intensive image signal processing. However, the selection of suitable camera modules is limited by the properties of the controller.

These controllers generally have an interface to a WLAN module in order to exchange firstly, image data, but secondly also device data and control commands across networks, e.g. with a server. In this regard we may be dealing, for example, with a small WLAN circuit board that contains essentially a WLAN radio chip with performance appropriate for handling the WLAN protocol and a circuit path antenna.

The controller—which is the primary device controller on an electronic operating and display unit and is very heavily laden with other tasks such as setting up the display content, checking of keyboard operations and the control of cooking programs—must additionally transport large quantities of data from the camera to the WLAN module, potentially even also take over image signal processing (e.g. conversion of Bayer patterns, compression etc.). Generally in addition to the control computer itself, the interface between the control computer and WLAN module with usually low performance represents an additional "bottleneck," which greatly limits the potential transmission rate with respect to the image data.

However, the fastest possible and premium quality transfer of the image data to the external server and/or to the cloud is precisely what is necessary for image transmission in a method like the recognition of food to be cooked herein. Therefore according to the invention, a modified topology is provided in order to remove these disadvantages. In this regard a second controller is provided which is integrated with the network interface and is connected to the camera. This control unit is configured to bypass the primary device controller and to send images recorded by the camera over the network interface. Therefore the primary device controller is not laden with additional tasks beyond the actual task of controlling the operating and display apparatus and the cooking program.

Thus the image transmission can proceed with little delay and at greater data rates, so that a fast and/or better recognition of food to be cooked can be achieved.

According to one preferred embodiment, the second control unit is a system-on-chip device which features image processing and network functionality.

According to the invention, a system-on-chip device (SoC) with processor and integrated WLAN and multimedia functionality is used. Due to the direct processing of the camera signals (e.g. reduction of the resolution) with support from corresponding, highly optimized signal processing blocks in the SoC and a direct transport of the image data across the WLAN interface, an exceptionally high image rate is attained. The controller and/or the primary device controller is thereby relieved and can then deal with the actual control functions. No large volumes of data need be transferred across an interface between the camera, primary device controller, and network interface. The controller can exchange the comparatively small remaining quantities of control data with the SoC processor across a correspondingly less burdened interface. Thus neither the primary device controller nor the conventionally present interface between camera, primary device controller and network interface can have a retarding effect on the image transmission.

Since these SoCs have in the meantime become very economical and are readily available and are compatible with many camera modules, a topology of this kind is highly advantageous owing to the clearly higher performance and the clear separation of tasks. Also, a relatively simple variant is possible for devices without a camera/network capability. In addition, with respect to the selection of camera modules, the designer is relatively free and is not bound to the restrictions of the primary device controller.

According to another feature, a system is provided, comprising a cooking device like that described above; a server with a database which stores image characteristics of known foods to be cooked, and for each food to be cooked stores a uniquely associated cooking program, and also with a network interface; wherein the server is configured to implement a recognition of the recorded image received over the network interface of the food to be cooked, based on machine learning, in order to determine probabilities of the coincidence of the food to be cooked with known foods to be cooked; if at least one probability exceeds a default threshold value, selection of a cooking program which is associated with the corresponding known food to be cooked; specifying the selected cooking program to the cooking device.

One example of the invention is depicted schematically in the drawings and is explained in greater detail below. The drawings are provided herewith for purely illustrative purposes and are not intended to limit the scope of the present invention.

DETAILED DESCRIPTION OF THE DRAWINGS

Figure 1:
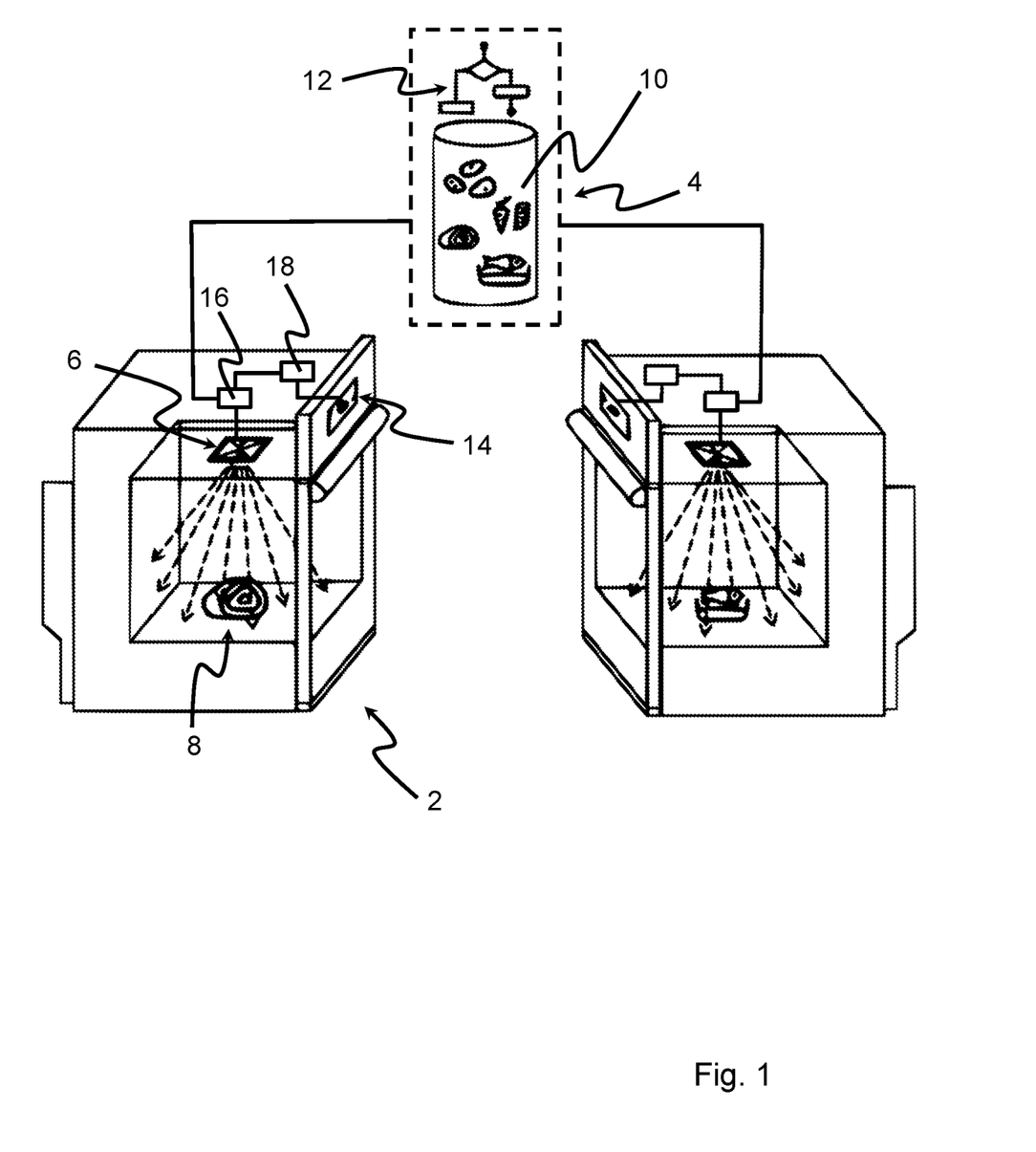
FIG. 1 is a schematic representation of one embodiment of the invented system.

FIG. 1 depicts a schematic representation of one embodiment of a system according to the invention, comprising at least one cooking device 2 and a server 4. The server 4 can stand as a representative for an internet-based cloud service that is implemented on one or on a plurality of physical or virtual servers.

The cooking device 2 features a camera 6 with which an image of the food, represented here as a piece of meat 8, for example, can be recorded. The food, which is located on the platter for the food to be cooked (simplified here as the bottom of the cooking space), in this invention is recorded by the camera 6 before beginning of a cooking program. The image data are transferred to the server 4. The communications interface herein can be, for example, a WLAN interface 16 in the cooking device 2. Under certain circumstances, the cooking device 2 can handle the preparation of recorded image material, such as scaling, white balance, determining of relevant image sections, etc.

The server 4 features a database 10 that saves the image characteristics of known foods to be cooked (represented here, for example, as fish, meat, vegetables and potatoes) and for each food to be cooked saves a uniquely associated cooking program, and also a network interface (not illustrated) for connection to cooking devices 2. The server 4 is configured to implement a recognition of food to be cooked, based on machine learning 12, by the use of received image data and the database 10. The recognition of food to be cooked, based on machine learning, recognizes samples and arranges them at an evaluated probability into default classes.

Depending on the recognition probability/probabilities, one or a plurality of automatic programs are displayed for and suggested to the user via the device display 14. These automatic programs are downloaded either from the device memory of the cooking device 2, or from the central cloud and/or from the server 4. Depending on the determined food, the cooking process is optimized in that an optimum cooking program is proposed. All information necessary for adjusting of parameters of the cooking process are consequently determined and selected automatically.

Current cooking devices have available operating systems in which the evaluation of image data for object recognition takes place locally, thus inside the device. Due to the relocation of this processing into the cloud according to the invention, memory capacities and computer services and the associated costs can be reduced. The central infrastructure makes it possible to allow new device functions and automatic programs to be added via the cloud without changing the device. Maintenance of the system and the exchange of data are consequently uncomplicated.

Figure 2:
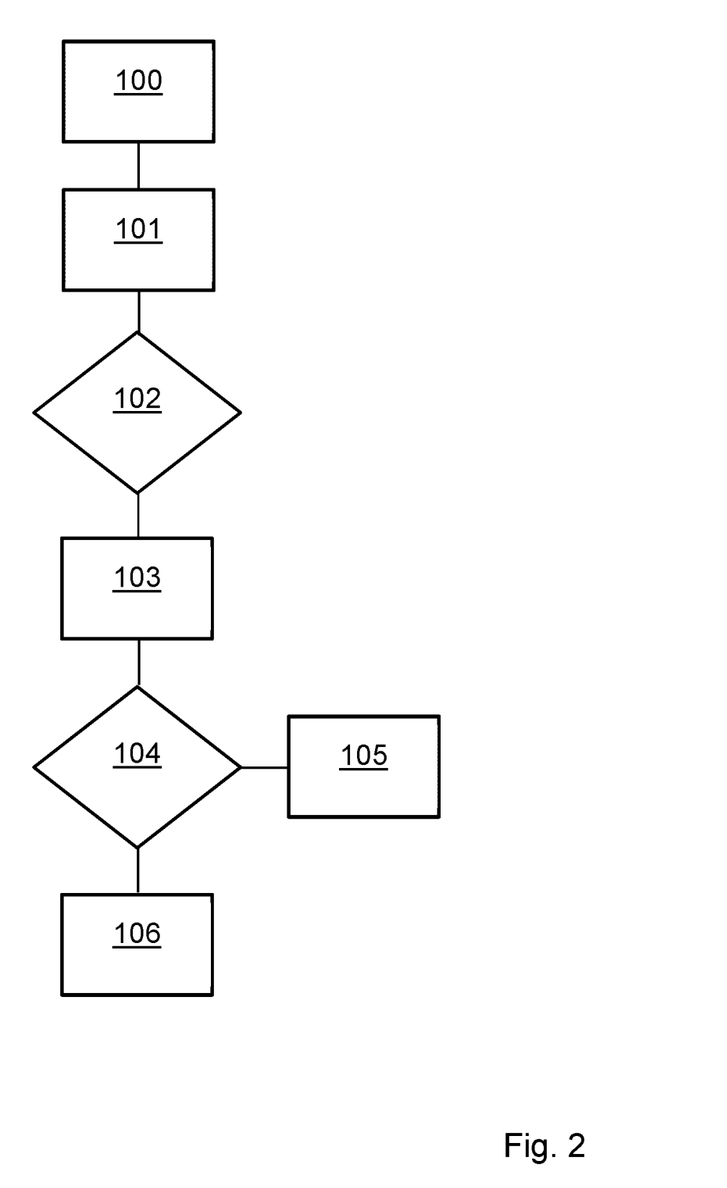
FIG. 2 is a flow chart of one embodiment of a method according to the invention.

FIG. 2 represents a flow chart of one embodiment of the method according to the invention. In step 100 the image of food to be cooked is recorded. This step can be implemented by a camera integrated in the cooking device, or alternatively by a mobile terminal with a built-in camera, such as a smartphone or tablet.

In step 101 there occurs a recognition of the recorded image of the food to be cooked, based on machine learning, in order to determine probabilities of the coincidence of the food to be cooked with known foods to be cooked. This takes place preferably in the cloud or on a server external to the cooking device.

In step 102 a check is run to determine whether at least a determined probability exceeds a default threshold value. If this is the case, in step 103 a cooking program associated with the corresponding probable food to be cooked is selected and sent to the cooking device; that is, either the cooking program per se is transferred to the cooking device, or information which enables the cooking device to determine the proper cooking program itself, is called up for example from an internal device memory. If no probability is found above the threshold value, then a successful recognition cannot be assumed. In order not to give the user of the cooking device any most likely wrong suggestion, in this case no cooking program will be sent to the cooking device.

A check is run in step 104 to determine whether the user subsequently starts or discards the cooking program proposed in step 103. In the case of a discard, in step 105 the saved probability for the food to be cooked recognized in step 101, and for the recorded image is reduced. In the case that the user starts the proposed cooking program, in step 106 the saved probability for the food to be cooked recognized in step 101 and for the recorded image is increased.

An algorithm on the server and/or in the cloud can recognize repeated dishes or foods to be cooked which are not yet saved, and thus recognize the user's preferences. Based on this information, it prepares and assigns user-specific automatic programs. The direct device-cloud link allows image data from all operated cooking devices to be saved and processed in the cloud. Due to the generated volumes of image data, the self-learning algorithm (machine learning) obtains a greater number of possible comparisons compared to data saved locally in the cooking device, and thus can better differentiate defined characteristics from each other. This process makes possible a continuous optimizing of object recognition, a reduction in identification errors and an increase in the probability of recognition.

The function of visual object recognition is continuously improved due to machine learning. By starting or discarding suggested programs, the user takes over the classification, thus the selection data can be used directly for recognition of samples. In addition it is possible to analyze the usage behavior of an individual user, and based on this evaluation, to populate the dish with the greatest number of preparation options as an automatic program in its individual cooking device. In addition it is possible to identify previously unknown dishes with a high usage frequency and relevance, and to offer this subsequently.

The invention improves the user-friendliness of the cooking device and guarantees a perfect cooking result which is independent of the user. Thus the interaction effort for the user is reduced.

Figure 3:
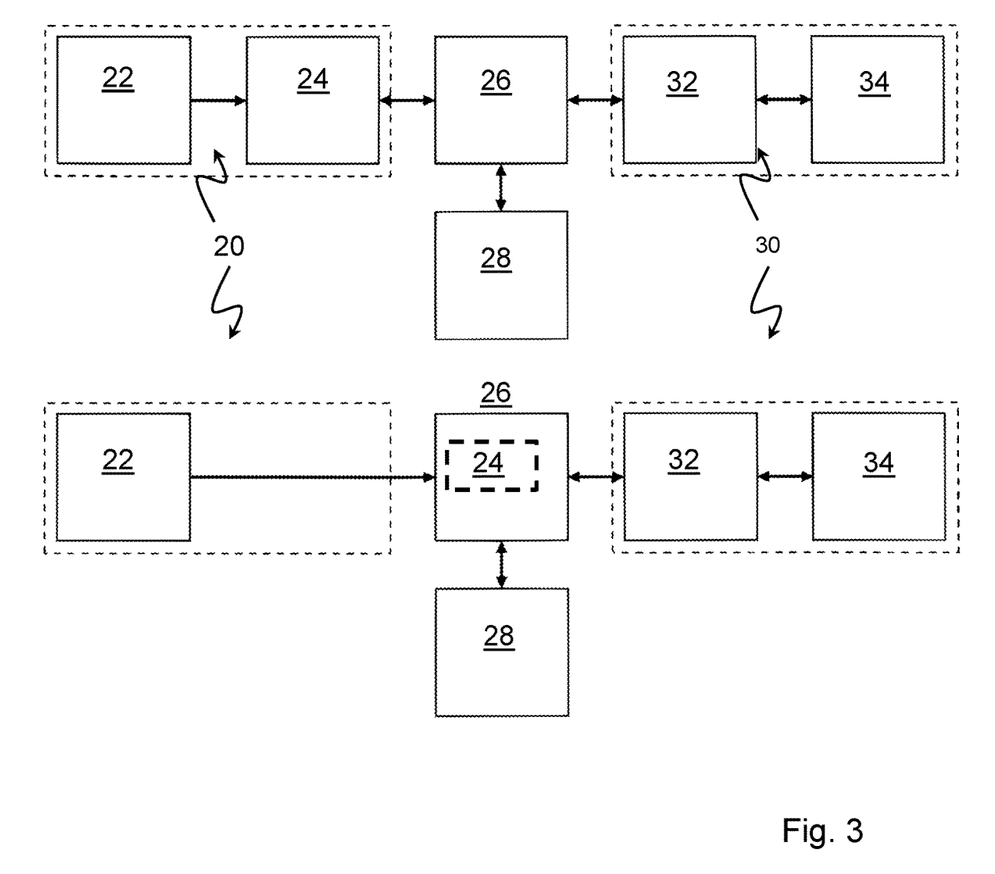
FIG. 3 is a schematic representation of conventional system topologies.

FIG. 3 depicts two conventional system topologies as they are used for cooking devices with integrated camera. In the upper part of the Fig. a variant is shown in which a camera module 20 with camera chip 22 and integrated image signal processing 24 (ISP) is tied to a microcontroller or microprocessor 26 over a powerful interface, such as a MIPI. Additional electronic modules 28 of the cooking device can be tied in to the processor 26. A WLAN module 30 with a WLAN-capable chip 32, and an antenna 34 is likewise tied in to the processor 26. The electronic modules and also the WLAN module are linked to the processor via interfaces of lesser performance capability.

In the lower part of FIG. 3 an alternative topology is depicted, with otherwise equivalent components, in which the image signal processing/ISP 24 is integrated into the processor 26 instead of into the camera module 20.

A disadvantage of these conventional topologies is that the processor 26 as primary computer is responsible for the operating and display electronics, and also the device controller, and is thus heavily laden with other, highly prioritized tasks. Thus for the transfer of large volumes of data from the camera module 20 out ultimately to the WLAN module 30 only a little processing time or power is left, especially if the processor 26 also has to take over the image processing or parts thereof. In addition, an additional "bottleneck" is represented by the usually less powerful interface from the processor 26 to the WLAN module 30.

Due to these problems, these conventional topologies are especially disadvantageous in connection with the recognition of food to be cooked. Necessarily high resolutions, image qualities and also image transmission rates are required for a qualitatively good, and essentially delay-free recognition. Without the correspondingly high image qualities, the probability of recognition would decrease, and with very slow transmission of the needed image data to the server/cloud, delays would result which would be unacceptable for a user. However, the recognition of food to be cooked must be both reliable and also as free of delay as possible in order to be acceptable by the user.

Figure 4:
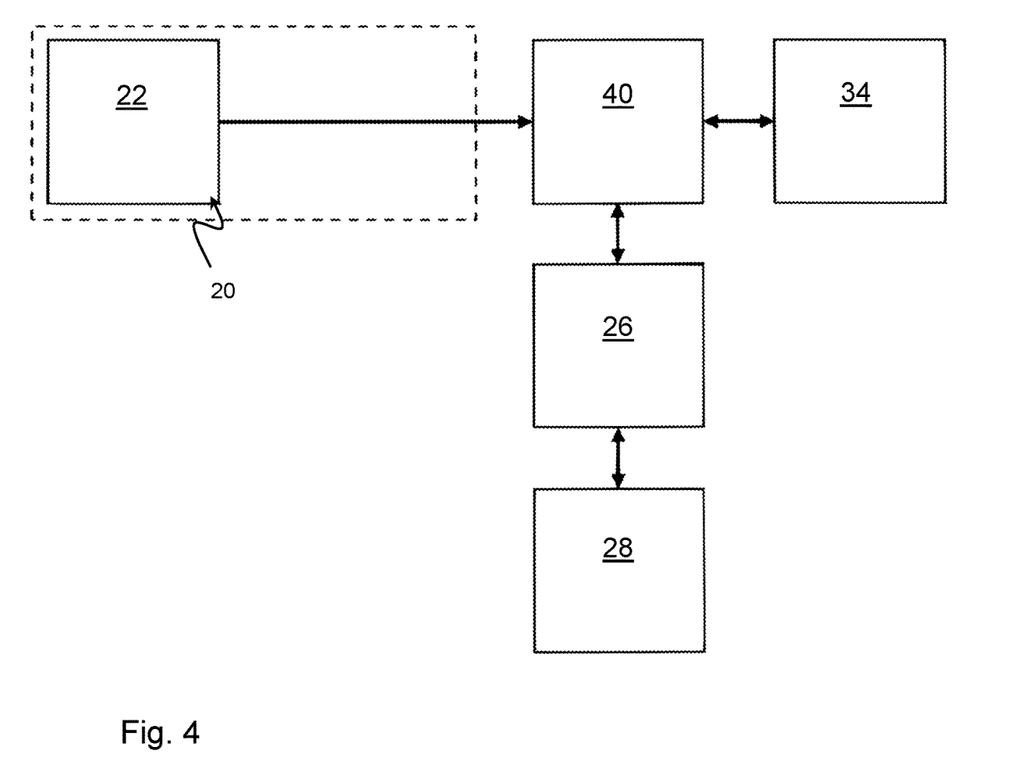
FIG. 4 is a schematic representation of a system topology according to the invention.

FIG. 4 depicts a system topology according to the invention for use in cooking devices with recognition of food to be cooked. The camera module 20 with camera chip 22 herein is connected to a system-on-chip device (SoC) 40 by means of a high-performance interface; this SoC features a powerful processor with integrated WLAN and multimedia functionality. An antenna 34 is provided for the WLAN transmission and is connected to the SoC 40. According to the invention, the SoC 40 takes over the processing and transmittal by WLAN of the large data volumes of image data for the recognition of food to be cooked. The processor 26 and/or the primary device controller is thus bypassed in this case.

The processor 26, which takes over the tasks of control of the operating and display electronics, and also the device control, and thus the implementation of cooking programs, is not connected with the camera module 20. Instead, it is connected via an interface of lesser capability to the SoC 40. Additional electronic components such as sensors, motors, heating units etc. are connected to the processor 26 via a likewise less powerful interface.

A topology of this kind is highly advantageous due to the clearly greater performance and the clear separation of tasks. Neither the important image recognition and transmission are hindered by the laden processor 26, nor are the operating and display processes delayed due to image recognition and transmission. Thus this system topology is [sic] for cooking devices with recognition of food to be cooked.

Also, with this topology a relatively simple variant is possible for devices without a camera. In addition, with regard to the selection of camera modules, this topology is more flexible and is not tied to the possibilities and/or parameters of the processor 26.

While the above description constitutes the preferred embodiments of the present invention, it will be appreciated that the invention is susceptible to modification, variation and change without departing from the proper scope and fair meaning of the accompanying claims.

The invention claimed is:

1. A method to control a cooking device using a processor and non-transitory memory, the cooking device for use by a user, the method comprising the following steps:
 recording an image of food to be cooked in the cooking device;
 implementing, in the processor, a recognition of the recorded image of the food to be cooked, based on machine learning, and determining probability values of a likelihood that the recorded image of the food to be cooked corresponds to known foods to be cooked stored in memory;
 upon one of the probability values exceeding a default threshold value, selecting via the processor a cooking program associated with the corresponding one of the known foods to be cooked whose probability value exceeded the default threshold value;
 specifying, via the processor, the selected cooking program to the cooking device;
 recommending, via the cooking device, the selected cooking program to the user; and
 at least one of the two following steps via the processor,
  increasing the probability value for the recorded image and the one of the known foods associated with the recorded image in response to a user subsequently starting the selected cooking program that was recommended; and
  reducing the probability value for the recorded image and the one of the known foods associated with the recorded image in response to the user discarding the selected cooking program that was recommended.

2. The method according to claim 1, when one the two following conditions is met:
 no probability value exceeds the default threshold value; and
 the user discards the selected cooking program, the method comprising the following steps in the processor:

detecting at least one of the food to be cooked and a cooking program subsequently selected by the user of the cooking device;

and at least one of the following two steps in the processor:

creating an association between the recorded image and at least one of the food to be cooked and the cooking program; and increasing of the probability of an existing assignment.

3. The method according to claim 1, wherein the image is recorded by a camera of the cooking device or by a mobile terminal.

4. The method according to claim 1, when the probability values of a plurality of known foods to be cooked exceed the default probability value, further comprising the following steps, selecting via the processor a respective cooking program for each of the known foods to be cooked whose probability value exceeds the default threshold value;

the processor giving input to the cooking device of the selected respective cooking programs in the sequence of descending probability values;

wherein the probability value for the recorded image and the one of the known foods associated with the recorded image is increased for the one of the selected respective cooking programs that is subsequently started by the user.

5. The method according to claim 4, wherein the probability value for the recorded image and the associated food to be cooked for each of the other ones of the cooking programs which the user does not subsequently start are reduced.

6. The method according to claim 1, wherein the selected cooking program is input to the cooking device via the processor so that a food to be cooked is specified for the associated cooking program.

7. A cooking device for implementing the method according to claim 1, the cooking device comprising:

a primary device control unit for controlling operating elements, display elements, and cooking functions of the cooking device;

a network interface with a second control unit; and a camera connected to the second control unit and configured to record images of a cooking space of the cooking device;

wherein the second control unit is configured to process recorded images independently of the primary device control unit and to transmit them over the network interface.

8. The cooking device according to claim 7, wherein the second control unit is a system-on-chip device configured to perform image processing and network functionality.

9. The method of claim 1, wherein the steps of increasing the probability value or reducing the probability value include storing the increased or reduced probability value in the memory.

10. A cooking system, comprising:

a cooking device according to claim 7, a server with the processor and a database storing image characteristics of known foods to be cooked, wherein, for each of the known foods to be cooked, the database stores a uniquely associated cooking program; and a network interface;

wherein the server is programmed to perform the following steps:

implementing a recognition of a recorded image of food to be cooked received over the network interface, based on machine learning, to determine probability values of a likelihood that the food to be cooked corresponds to known foods to be cooked;

upon one of the probability values exceeding a default threshold value, selecting a cooking program associated with the corresponding one of the known foods to be cooked; and specifying the selected cooking program to the cooking device.

* * * * *